E. E. MAGGARD.
INTERMITTENT MOTION DEVICE.
APPLICATION FILED DEC. 16, 1913.
1,168,086.
Patented Jan. 11, 1916.
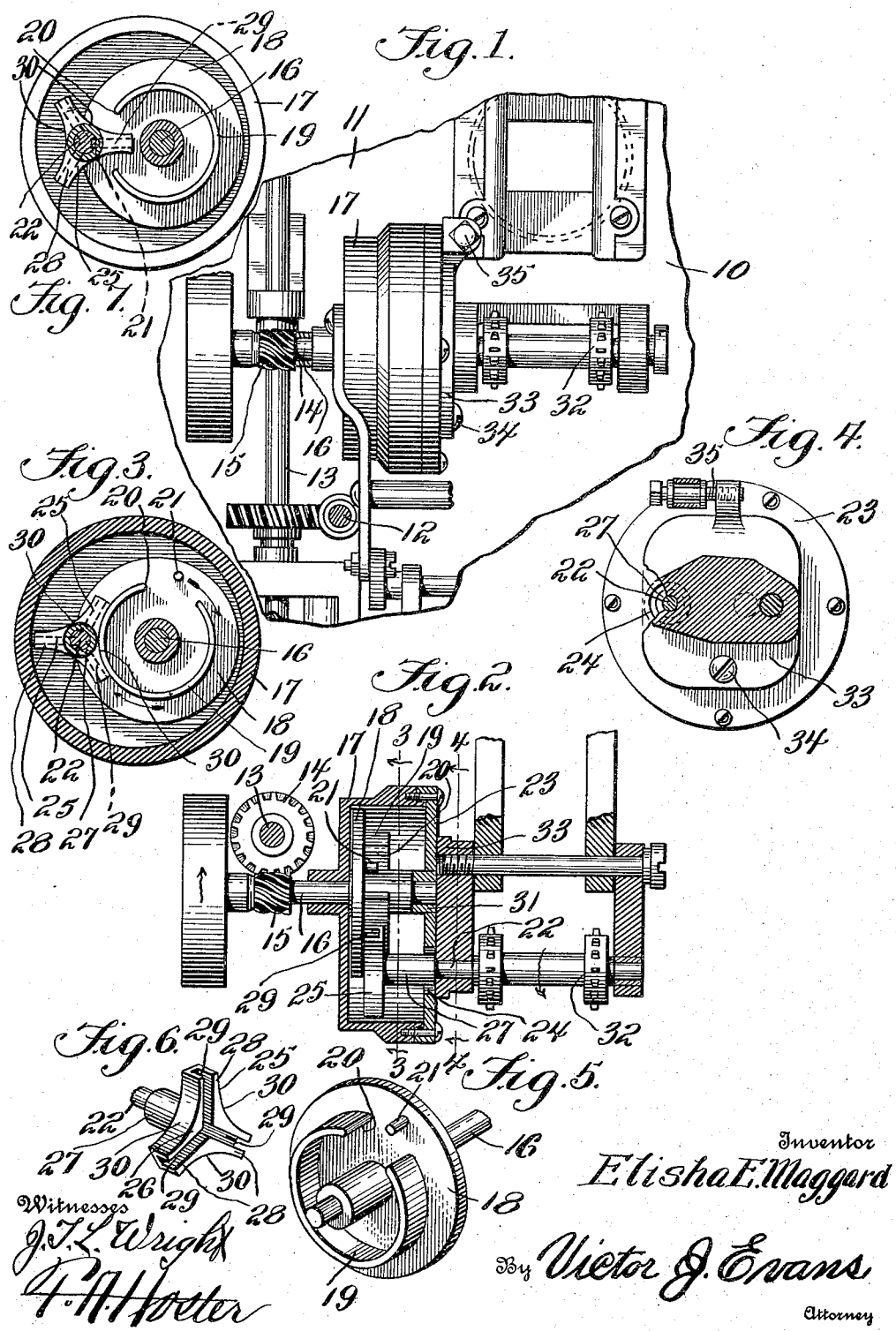

UNITED STATES PATENT OFFICE.

ELISHA E. MAGGARD, OF MOREHEAD, KENTUCKY.

INTERMITTENT-MOTION DEVICE.

1,168,086.  Specification of Letters Patent.  Patented Jan. 11, 1916.

Application filed December 16, 1913. Serial No. 807,108.

*To all whom it may concern:*

Be it known that I, ELISHA E. MAGGARD, a citizen of the United States, residing at Morehead, in the county of Rowan and State of Kentucky, have invented new and useful Improvements in Intermittent-Motion Devices, of which the following is a specification.

An object of the invention is to provide a device whereby a continuously operating driving shaft will impart an intermittent motion to a driven shaft.

The invention is particularly adaptable for use in connection with motion picture machines and contemplates a device adapted to be operated by the driving shaft of a machine and through the medium of which an intermittent rotation is conveyed to a driven shaft preferably carrying a film wheel of a sprocket type and which is adapted to be engaged by the film whereby the intermittent motion of the film wheel will advance the film across the aperture plate of the machine.

Although various type of intermittent motion devices have been used heretofore, the majority of them being constructed upon the principle of a Geneva movement, many of these devices, aside from being complicated, cumbersome and subject to great wear, fail to attain the desired result when used in connection with motion picture apparatus. A large number of these known devices are constructed on the principle of a Maltese cross and in many instances have four or more points of contact with a pin carried by a rotating cam, and whereby, through the operation of the cam, an intermittent rotation will be imparted to the member constructed in the nature of a Maltese cross.

I aim to provide a device of a substantially triangular construction and which specifically comprehends a single member of a triangular construction, having intercommunicating grooves formed on the vertices of the member, whereby, when the member is related to a revolving cam, having a projecting pin operable in the grooves of the member, the resultant intermittent motion imparted to the shaft carrying the said member will be one of a positive nature in which the last mentioned shaft will be intermittently rotated without the great wear and tear upon the triangular member as is occasioned in the use of such members mentioned heretofore having the configuration of a Maltese cross. By constructing the intermittent motion producing member on my device to conform to a triangular configuration, I provide a structure which, with a minimum amount of wear and with very little resistance, will result in a quicker shifting of the film on the motion picture machine at the moment that the source of light has been interrupted by the usual shutter and will furthermore greatly decrease the pull and strain upon the film during the moment of shifting the same.

A still further embodiment of the invention resides in a simple means whereby the intermittent motion producing member can be adjusted relatively to the cam and the pin thereof in order to take up for any wear which may result in the continuous use of the device.

In the further disclosure of the invention reference is to be had to the accompanying drawings, constituting a part of this specification, in which similar characters of reference denote corresponding parts in all the views, and in which:

Figure 1 is a fragmentary rear elevation of a motion picture machine, showing my device applied thereto; Fig. 2 is a horizontal sectional view taken through the device; Fig. 3 is a vertical transverse sectional view taken on the line 3—3 in Fig. 2; Fig. 4 is a vertical transverse sectional view taken on the line 4—4 in Fig. 2; Fig. 5 is a perspective view of the cam removed from the casing; Fig. 6 is a perspective view of the triangular member; and Fig. 7 is a view similar to Fig. 3 but showing the cam and triangular member in different positions.

Referring more particularly to the views, I disclose a motion picture machine 10 consisting of the usual frame 11, a driving unit 12, a driving shaft 13 carried on the frame and operable by the driving unit 12 and which may be in the nature of a motor. The driving shaft 13 preferably is arranged in a vertical position with respect to the frame and carries a wheel 14 meshing with a worm 15 keyed to a shaft 16 which is eccentrically journaled on a casing 17 and projects therein.

Rigidly secured to the inner end of the shaft 16 and which, for the purpose of description I will term the driving shaft, is a disk 18, suitably keyed on the inner end of the shaft to rotate within the casing 17. The disk 18 has formed therewith a circular flange 19 projecting from the inner face of the disk and having a cut out portion 20, a lateral pin 21 being also provided on the inner face of the disk 18 and lying outside of the flange 19 adjacent to the cut out portion 20 thereof. Thus it will be apparent that the disk and its component parts is in the nature of a cam.

A shaft 22 and which I will term a driven shaft is journaled on a frame 23 supported on the frame 11 of the motion picture machine and projects into the casing 17 through an enlarged opening 24 in the casing, the said driven shaft 22 being also eccentrically arranged with respect to the casing as shown. Secured on the inner end of the driven shaft 22 is a triangular member 25 preferably formed of a single piece of material providing a body 26 having an integral sleeve 27, through which the free end of the driven shaft extends, the said body 26 being triangularly shaped to provide three equidistantly spaced arms 28, each of which has a longitudinal groove 29, with the said grooves open at their outer ends and intercommunicating at their inner ends and on a line with the axis of the body 26, the sides 30 forming the arms 28 being similarly curved as shown. The casing 17 is preferably made in two parts so that when the same are connected one part of the casing will have the free extremity of the driving shaft 16 extending into a suitable bearing 31 on that part of the casing. Now it will be apparent by referring to the views that the pin 21 will operate in the grooves 29 of the triangular member 25 when rotation is imparted to the disk 18. As shown, the sides of the triangular member are curved to conform to the circular flange 19 and one of said sides will at all times bear against the flange. Now as the disk is rotated the pin will enter one of the longitudinal grooves of the triangular member, thus causing the member to turn and the pin will continue to advance into the groove until it reaches its inner end and at which point the said groove communicates with the other grooves of the member. By this time the triangular member will have made a sixth of a revolution and upon continuing the rotation of the disk 18 the pin will be retreated through the groove which it has entered, thus further turning the triangular member so that when the pin leaves the groove thereof the said member will have been rotated one third of a revolution and the next groove of the member will be in line to receive the pin when the disk 18 carrying the pin makes a complete revolution. Therefore, when a continuous rotation is imparted to the disk 18 the resulting operation of the driven shaft 22 will be that of an intermittent rotation and at each revolution of the disk a film wheel 32, carried on the driven shaft 22, will be subjected to rotation of an intermittent nature so that the usual film of the motion picture machine which is adapted to engage and operate over the film wheel, will be intermittently advanced when the machine is operated. It will of course be seen by referring to the views that the intercommunicating grooves 29 are formed in that face of the member 25 which is adjacent to the face of the disk 18 which carries the circular flange 19 and, when the disk is rotated within the casing, the pin on the disk, operating in the grooves of the triangular member, will cause the arms thereof to successively extend through the cut out portion 20 of the circular flange, whereas while the pin of the disk, after having left one of the grooves of the triangular member, completes a revolution to again enter a new groove of the member, one of the curved sides of the said member will lie against the circular flange of the disk, this construction being also clearly set forth in the views.

From the foregoing description it will thus be apparent that when the driving shaft 16 is continuously rotated by the shaft 13 connecting with the driving unit 12, the driven shaft 22 will be intermittently rotated, thus imparting an intermittent movement to the film wheel 32 and the film wheel 32 will make a complete revolution at the end of every three revolutions of the disk 18. It will therefore be apparent that with a triangular part of the character described operable in connection with a cam such as the disk and pin described, the angles between the arms of the member are greater than would be the case if there were four arms and the member constructed in the nature of a Maltese cross, and consequently the wear occasioned by the pin passing through the grooves of the triangular member will be greatly reduced in that there will not be any binding between the pin and the member inasmuch as the angles between the grooves and which in this instance would be one hundred and twenty degrees would insure a smoother operation of the pin through the grooves than would be the case if the angles between adjacent grooves were of less degree in size.

The frame 23 terminates at one end in a head 33 of a flat nature and which abuts against a face of the casing 17. As mentioned heretofore, the driven member 22 projects through the enlarged opening 24 of the casing and in order to permit of an adjustment of the triangular member 25 with respect to the point of rotation of the disk 18 carrying the pin 21, I preferably have the casing 17 mounted to swing on the head 33 by means of a screw 34 passing through one side of the head of the casing, the said head 33 having loose connection with a screw rod 35 threaded on the casing 17 and whereby, when the screw rod is operated, the head will be moved relatively to the casing, thus slightly moving the driven shaft relatively to the enlarged opening of the casing through which it extends and consequently resulting in the triangular member being moved slightly toward or away from the center of rotation of the disk 18 and which in this instance is the driving shaft 16. The driven shaft 22 therefore can be arranged to rotate loosely with respect to the driving shaft on account of the adjustable connection provided between the triangular member on the driven shaft and the disk and pin on the driving shaft.

Having thus described my invention, I claim:

1. In an intermittent motion mechanism, a casing, a revoluble disk in the casing, a pin on the disk, a shaft, a frame having the shaft journaled thereon, with the shaft projecting into the said casing, a grooved member carried on the shaft and having the pin of the disk operating in the groove thereof when rotation is imparted to the said disk, whereby an intermittent rotation is imparted to the said shaft, and means connecting the said frame with the said casing for permitting of an adjustment of the said grooved member relatively to the said pin.

2. In an intermittent motion device, a casing, a driving shaft extending into the casing, a driven shaft extending into the casing, a cam-like disk carried by the driving shaft and rotatable therewith within the casing, a pin on the said disk, a grooved triangular member on the driven shaft and having the pin of the disk operating in the grooves thereof when rotation is imparted by the said disk to the driving shaft, whereby the said driven shaft will be intermittently rotated, and an adjusting device on the casing and coöperating with the said frame for adjusting the said grooved member relatively to the axis of rotation of the said disk.

3. In an intermittent motion mechanism, the combination with a frame, of a flat head on the frame, a driven shaft journaled on the frame, a casing carried by the frame, a driving shaft journaled on the casing and extending therein, a triangularly shaped member provided with intercommunicating grooves and supported on the said driven shaft, a disk on the driving shaft, a pin on the disk and operating in the intercommunicating grooves of the said member for imparting an intermittent motion to the driven shaft when the driving shaft is operated, and an adjusting member connecting the head of the said frame with the said casing for adjusting the said triangularly shaped member relatively to the axis of rotation of the said disk.

4. In an intermittent motion device, the combination with a driving shaft, of a casing having one end of the driving shaft extending therein, a driven shaft extending into the casing, a frame having the driven shaft journaled thereon, said frame supporting the casing, means connecting the driving shaft with the driven shaft for imparting intermittent motion to the driven shaft when the driving shaft is operated, and means on the casing and coöperating with the frame for adjusting the driven shaft relatively to the driving shaft.

In testimony whereof I affix my signature in presence of two witnesses.

ELISHA E. MAGGARD.

Witnesses:
F. A. HOSTER,
E. EDMONSTON, Jr.

Copies of this patent may be obtained for five cents each, by addressing the "Commissioner of Patents, Washington, D. C."